(12) United States Patent
Masterman

(10) Patent No.: US 10,372,782 B1
(45) Date of Patent: Aug. 6, 2019

(54) CONTENT GENERATION AND EXPERIMENTATION USING ENGAGEMENT TESTS

(71) Applicant: Amazon Technologies, Inc., Seattle, WA (US)

(72) Inventor: Michael Frederick Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 467 days.

(21) Appl. No.: 14/500,258

(22) Filed: Sep. 29, 2014

(51) Int. Cl.
*G06F 17/00* (2019.01)
*G06F 17/18* (2006.01)
*G06F 17/21* (2006.01)
*G06F 16/958* (2019.01)

(52) U.S. Cl.
CPC .................. *G06F 16/958* (2019.01)

(58) Field of Classification Search
CPC ............ G06F 17/211; G06F 17/30905; G06F 3/04847; G06F 17/24; G06F 17/30896; G06F 17/30893
See application file for complete search history.

(56) References Cited

U.S. PATENT DOCUMENTS

| 6,934,748 | B1* | 8/2005 | Louviere | G06Q 30/02 709/224 |
| 8,234,632 | B1* | 7/2012 | Hugeback | G06F 11/3495 717/130 |
| 8,296,643 | B1* | 10/2012 | Vasilik | G06F 17/3089 715/200 |
| 8,615,512 | B2* | 12/2013 | Wexler | G06F 16/9535 707/723 |
| 8,997,081 | B1* | 3/2015 | Manion | G06F 8/65 717/168 |
| 10,061,860 | B2* | 8/2018 | Daly, Jr. | G06F 17/211 |
| 2003/0130982 | A1* | 7/2003 | Kasriel | G06F 17/3089 |
| 2004/0075686 | A1* | 4/2004 | Watler | G06F 17/3089 715/749 |
| 2006/0162071 | A1* | 7/2006 | Dixon | G06Q 30/02 5/93.1 |
| 2009/0030859 | A1* | 1/2009 | Buchs | G06F 17/30899 706/19 |
| 2009/0282343 | A1* | 11/2009 | Catlin | G06Q 30/02 715/738 |
| 2011/0196690 | A1* | 8/2011 | Peles | G06Q 30/02 705/1.1 |
| 2016/0077672 | A1* | 3/2016 | Anderson | G06F 17/211 715/234 |

* cited by examiner

*Primary Examiner* — Ariel Mercado
(74) *Attorney, Agent, or Firm* — Kilpatrick Townsend & Stockton LLP

(57) ABSTRACT

In some examples, a content variation service may identify elements of content and generate variations of the elements of the content programmatically. Content may include a website and the elements of the content may include visual and structural elements that make up the website. The variations of the elements may be provided with the content to a user as part of an engagement test. The engagement test may test how the user interacts with the variations of the elements. Based on results of the engagement test, the elements of the content may be adjusted and other variations may be generated.

20 Claims, 8 Drawing Sheets

US 10,372,782 B1

CONTENT GENERATION AND EXPERIMENTATION USING ENGAGEMENT TESTS

BACKGROUND

Content, such as web-based content, may be developed by a stakeholder. The development of content may include configuring and arranging elements of the content. The stakeholder may be interested in determining the effectiveness of certain configurations and arrangements of the elements of the content.

BRIEF DESCRIPTION OF THE DRAWINGS

Various embodiments in accordance with the present disclosure will be described with reference to the drawings, in which.

DETAILED DESCRIPTION

Figure 1:
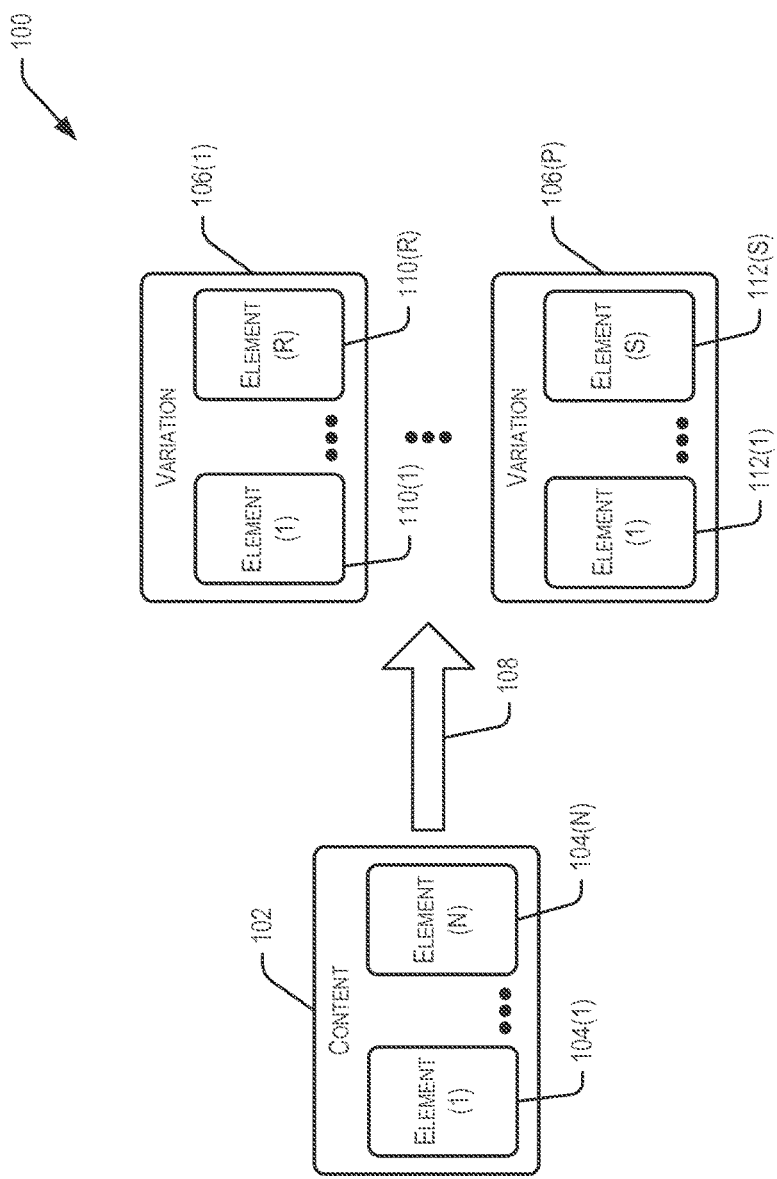
FIG. 1 is an example environment for implementing techniques relating to content generation and experimentation as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present specification are directed to, among other things, content generation and experimentation. In particular, this specification describes techniques related to content generation and experimentation in the context of network-based resources (e.g., webpages, websites, etc.) provided as part of an electronic marketplace. While the particular techniques will be discussed in the context of webpages provided as part of an electronic marketplace, this specification is not limited to this particular context. For example, as would be apparent to one of ordinary skill in the art, the techniques described herein may be applicable to any suitable content including objects that may be generated programmatically and provided for experimentation, such as objects or elements of text-based files, objects or elements of image-based files, objects or elements of digital media content, or the like.

The content generation and experimentation techniques described herein may be implemented by stakeholders to increase the effectiveness of particular content (e.g., a website). For example, stakeholders may host the website in order to offer a particular service to visitors of the website. Using the techniques described herein, elements that make up the website may be adjusted and then presented to the visitors of the website. Based on how the visitors engage with the website before and after the adjustments, feedback may be collected. The feedback may be used to further adjust the elements of the website and to make other changes to the website. In this manner, the effectiveness of the website may be increased.

Turning now to one example of content generation and experimentation, an operator of a website, such as an electronic marketplace, begins by enabling or otherwise allowing a content generation and experimentation service to access a webpage of the website. The webpage may include elements, such as text boxes, ordered and unordered lists, pictures, images, metadata, visual indicators, and other elements, that can be adjusted. An element of the webpage may be identified by accessing markup associated with the webpage or accessing attributes of visual elements associated with the webpage. Based on this, permutations of the element may be created. In some examples, the permutations may be generated in accordance with user-defined rules or machine-defined rules. The permutations may be variations of structural or visual attributes of the element. A permutation or many permutations are presented to visitors of the webpage as part of an engagement test, such as an A/B or A/B/C test. In this manner, the engagement test may be configured to test the effectiveness of certain permutations compared to other permutations. By utilizing machine-learning techniques, feedback from the engagement test may then be used to rank the presented permutations and to create other machine-defined rules to guide the creation of future permutations. In some examples, generation of permutations, creation of rules (whether user-defined or machine-defined), and presentation of permutations may be based on demographic information or other user information.

In some examples, the techniques described herein may be implemented by an operator of an electronic marketplace (or other website) to create and test a large number of variations very efficiently. The variations may be tracked as they are created and presented to users to determine whether the variations have an effect on user engagement with the content of the electronic marketplace. For example, in a typical content experimentation example, a content editor (e.g., a human editor) may select particular elements of a webpage to test. The content editor may then be tasked with creating variations of the elements. This may include the content editor manually adjusting attributes of elements. Once variations are created, they may be provided to a testing service that may be configured to present the variations to users. The variations may be presented in association with a multi-variant testing procedure, such as A/B testing, bucket testing, or other similar multi-variant testing procedures. The testing procedures may collect engagement information to measure, using success metrics, whether the variations affected user engagement with the content. For example, the success metrics may indicate that a certain variation of an unordered list resulted in more purchases of an item described by the list, compared to an initial order (i.e., default variation).

In accordance with the techniques described herein, variations of elements of content may be created automatically with little or no assistance from a content editor. This may be achieved, in part, by a computer configured to analyze the semantic markup (e.g., HTML, XML, and other similar markup languages) that describes structural attributes of the elements of the content and that is also configured to analyze other attributes of the elements of the content (e.g., identified names, numbers and units, brands, visual elements, and other similar attributes). Once analyzed, variations of the elements (and thus variations of the content) may be generated. In some examples, the variations are generated in accordance with one or more user-defined or machine-defined rules. These rules may be in place to guide the generation of variations and may also help to provide context to the generation of variations. Once generated, the variations can be presented to users in accordance with the techniques described previously. And, by using machine learning techniques (or other data processing techniques), additional rules to guide content generation and content experimentation may be created. In this manner, the confidence of the devices used to generate variations and perform experimentations may be increased.

Turning now to the figures, in which FIG. 1 illustrates environment 100 for implementing techniques relating to content generation and experimentation as described herein. The environment 100 may include content 102. The content 102 may be a webpage or other digital content item including one or more elements, such as element 104(1)-element 104(N). In some examples, the content 102 may include a single element, such as a popup window (e.g., the content 102) with a single text box (e.g., a single element). The elements 104(1)-104(N) are illustrated to represent that any suitable number of elements may be included in the content 102. The content 102 may have been created initially by one or more content editors (not shown). The content editors may be responsible for writing portions of machine-readable language that may dictate different aspects of how the elements 104(1)-104(N) are configured (e.g., arranged, formatted, laid out, and other aspects of configuration) with respect to the content 102 and regarding each other. For example, the aspects of the configuration of the elements 104(1)-104(N) may be determined from attributes of the elements 104(1)-104(N) based on semantic markup. In some examples, the aspects may be determined from attributes of the elements 104(1)-104(N) based on visual aspects of the elements 104(1)-104(N) that may be stored in association with the elements.

By implementing the techniques described herein, variations of the content 102, including variations of the elements 104(1)-104(N) may be automatically generated. Arrow 108 indicates that the content 102, including the elements 104(1)-104(N), may be used to generate variations such as content variations 106(1)-106(P). The content variations 106(1)-106(P) may include a plurality of variation elements, which may be variations of the elements 104(1)-104(N) of the content 102. For example, variation elements 110(1)-10(R) may be included in the content variation 106(1). In some examples, one of the variation elements 110(1)-110(R) may be an actual variation of the elements 104(1)-104(N). And, in some examples, more than one of the variation elements 110(1)-10(R) may be an actual variation of the elements 104(1)-104(N). In other words, in some examples, at least some of the variation elements 110(1)-110(R) may be different than at least some of the elements 104(1)-104(N) and at least some of the variation elements 110(1)-110(R) may be the same as at least some of the elements 104(1)-104(N). The content variation 106(P) may also include variation elements 112(1)-112(S), which may be variations of the elements 104(1)-104(N) and, in some examples, may be variations of the variation elements 110(1)-110(R).

Figure 2:
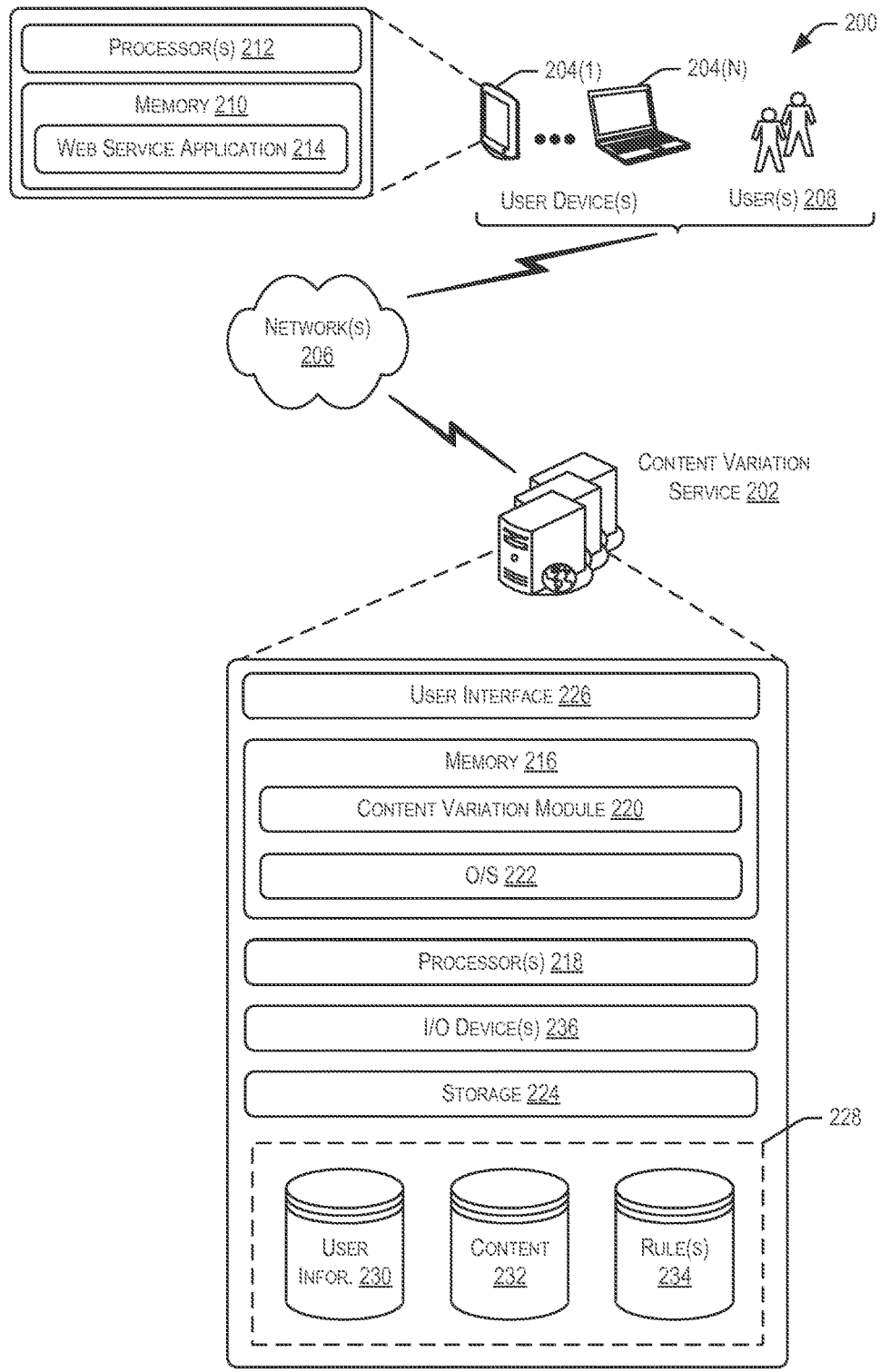
FIG. 2 is an example schematic architecture for implementing techniques relating to content generation and experimentation as described herein, according to at least one example.

Turning next to FIG. 2, in FIG. 2 is illustrated an example architecture 200 for implementing techniques relating to content generation and experimentation as described herein. The architecture 200 may include a content variation service 202. The content variation service 202 may be included as part of an electronic marketplace (not shown) and may interface with elements of the architecture 200 to implement the techniques relating to content generation and experimentation as described herein. In some examples, the content variation service 202 may be a stand-alone service operated on its own or in communication with an electronic marketplace. The content variation service 202 may be in communication with one or more user devices 204(1)-204(N) (hereinafter, "the user device 204") via one or more network(s) 206 (hereinafter, "the network 206"). The network 206 may include any one or a combination of many different types of networks, such as cable networks, the Internet, wireless networks, cellular networks, radio networks, and other private and/or public networks.

Turning next to the details of the user device 204, the user device 204 may be any suitable device capable of communicating with the content variation service 202. For example, the user device 204 may be any suitable computing device such as, but not limited to, a mobile phone, a smart phone, a personal digital assistant (PDA), a laptop computer, a personal computer, a desktop computer, a set-top box, a thin-client device, or other computing device. In some examples, the user device 204 may be in communication with the content variation service 202 via one or more web servers constituting an electronic marketplace (not shown) connected to the network 206 and associated with the content variation service 202. The user device 204 may be utilized by one or more users 208 (hereinafter, "the user 208") for interacting with the content variation service 202. The user device 204 may therefore include a memory 210, a processor 212, a web-service application 214, and any other suitable feature to enable communication and interaction with the elements of the architecture 200. The web-service application 214 may be in the form of a web browser, an application programming interface (API), virtual computing instance, or other suitable application. The user device 204 may be configured such that the user 208 may utilize the user device 204 to interact with the content variation service 202 to implement the techniques described herein.

Turning now to the details of the content variation service 202, the content variation service 202 may include one or more service provider computers, perhaps arranged in a cluster of servers or as a server farm, and may host web service applications. These servers may be configured to host a website (or combination of websites) viewable via the user device 204. The content variation service 202 may include at least one memory 216 and one or more processing units (or processor(s)) 218. The processor(s) 218 may be implemented as appropriate in hardware, computer-executable instructions, software, firmware, or combinations thereof. Computer-executable instruction, software or firmware implementations of the processor(s) 218 may include computer-executable or machine-executable instructions written in any suitable programming language to perform the various functions described. The memory 216 may include more than one memory and may be distributed throughout the content variation service 202. The memory 216 may store program instructions (e.g., a content variation module 220) that are loadable and executable on the processor(s) 218, as well as data generated during the execution of these programs. Depending on the configuration and type of memory including the content variation service 202, the memory 216 may be volatile (such as random access memory (RAM)) and/or non-volatile (such as read-only memory (ROM), flash memory, or other memory). The content variation service 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some examples, the memory 216 may include multiple different types of memory, such as static random access memory (SRAM), dynamic random access memory (DRAM), or ROM. Turning now to the contents of the memory 216 in more detail, the memory 216 may include an operating system 222 and one or more application programs, modules, or services for implementing the features disclosed herein including at least the content variation module 220.

In some examples, the content variation service 202 may also include additional storage 224, which may include removable storage and/or non-removable storage. The additional storage 224 may include, but is not limited to, magnetic storage, optical disks, and/or tape storage. The disk drives and their associated computer-readable media may provide non-volatile storage of computer-readable instructions, data structures, program modules, and other data for the computing devices. The memory 216 and the additional storage 224, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the content variation module 220. As discussed in more detail with reference to FIG. 3, the modules of the content variation service 202 may include one or more components. The content variation service 202 may also include input/output (I/O) device(s) and/or ports 236, such as for enabling connection with a keyboard, a mouse, a pen, a voice input device, a touch input device, a display, speakers, a printer, or other I/O device.

In some examples, the content variation service 202 may also include a user interface 226. The user interface 226 may be utilized by an operator, or other authorized user to access portions of the content variation service 202. In some examples, the user interface 226 may include a graphical user interface, web-based applications, programmatic interfaces such as application programming interfaces (APIs), or other user interface configurations. The content variation service 202 may also include data store 228. In some examples, the data store 228 may include one or more databases, data structures, or the like for storing and/or retaining information associated with the content variation service 202. The data store 228 may include data structures, such as, user information database 230, content database 232, and rules database 234.

In some examples, the user information database 230 may be used to retain information that may be used by the content variation service 202 to perform the techniques described herein. Such information may include, for example, information pertaining to the user 208, information pertaining to other users who do not interact with the content variation service 202, demographic information, and other types of information that may relate to users. For example, information pertaining to the user 208 may include user account information, preferences, regional and local identifiers, purchase history in an electronic marketplace, search history in an electronic marketplace, items placed in a digital repository (e.g., shopping cart) by the user at some point in time, items added to a future purchase list (e.g., a wish list), and other similar types of information pertaining to the user 208. In some examples, the demographic information may include information based on age, sex, nationality, race, ethnicity, occupation, employment status, interests, geographic region, economic identifiers, social status identifiers, and other demographic information. In some examples, the demographic information may be provided to the content variation service 202. In some examples, the demographic information may be collected by the content variation service 202 or an entity associated with the content variation service 202. In some examples, the content database 232 may be used to retain content, including elements, that may be provided to users as part of a website (or plurality of websites). For example, the content database 232 may include information pertaining to the webpages that are presented to the user 208 as part of an electronic marketplace. In some examples, the content from the content database 232 may be accessed by the content variation service 202 and, in accordance with techniques described herein, may be utilized to create variations of elements of the content. These variations of the elements may be also be retained in the content database 232. Within the rules database 234 may be retained rules for guiding the creation of content. In some examples, such rules may be machine-generated or user-generated, and may also include at least some default rules.

Figure 3:
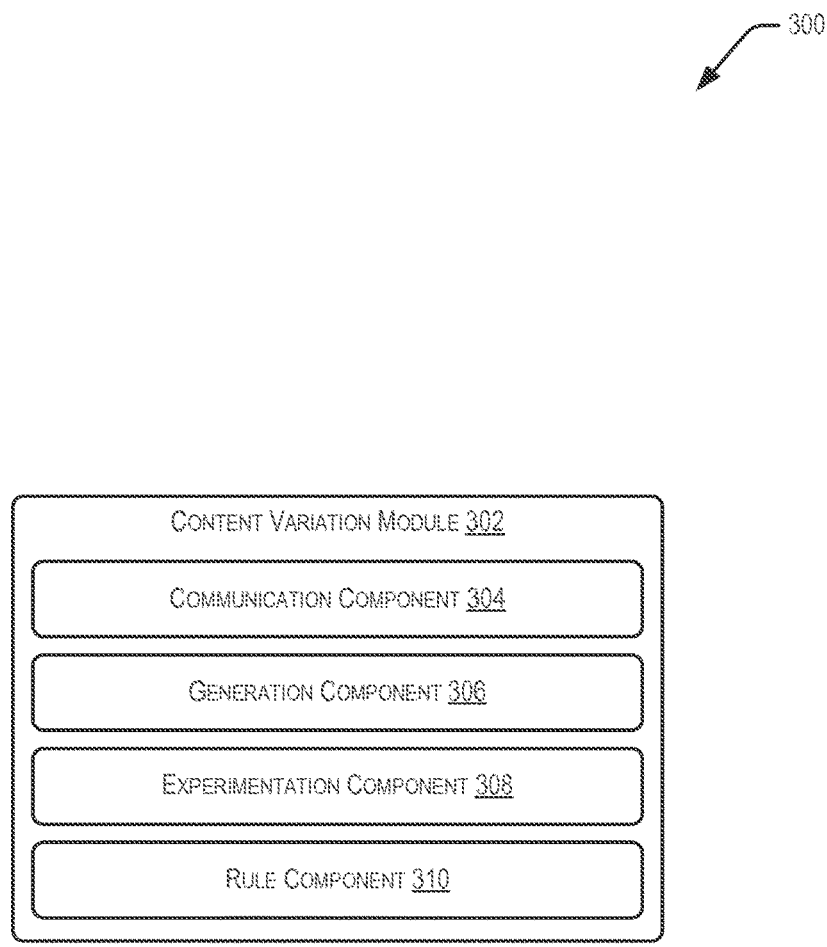
FIG. 3 is an example device for implementing techniques relating to content generation and experimentation as described herein, according to at least one example.

In FIG. 3, example device 300 is illustrated including a content variation module 302. The content variation module 302 is an example of the content variation module 220 discussed previously. The content variation module 302 may be configured to manage one or more sub-modules, components, and/or services directed to examples disclosed herein. In some examples, the content variation module 302 may include a communication component 304, a generation component 306, an experimentation component 308, and a rule component 310. While these modules and components are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other modules may perform the same tasks as the content variation module 302 or other tasks and may be implemented in a similar fashion or according to other configurations.

Generally, the communication component 304 may be configured to manage communications between user devices and a content variation service. For example, the communication component 304 may be configured to receive requests from user devices and send responses to user devices. The generation component 306 may be configured to access one or more data structures and/or memory devices to identify certain elements of content and generate variations of the elements of the content. In some examples, the variations of the elements are used by other components of the content variation service to evaluate the effectiveness of certain variations with respect users. The experimentation component 308 may be configured to access one or more data structures and/or memory devices to identify content, including elements, to provide to users. In some examples, the experimentation component 308 may provide content to users and collect engagement information (e.g., details about how users engaged with the content). In some examples, the experimentation component 308 may provide variations of content to users and collect engagement information. In accordance with techniques described herein, this engagement information may be used for many different purposes pertaining to content generation and experimentation. The rule component 310 may be configured to create, manage, and implement one or more rules. In some examples, the rules may include constraints to guide the content generation and experimentation and may be based at least in part on the engagement information.

Figure 4:
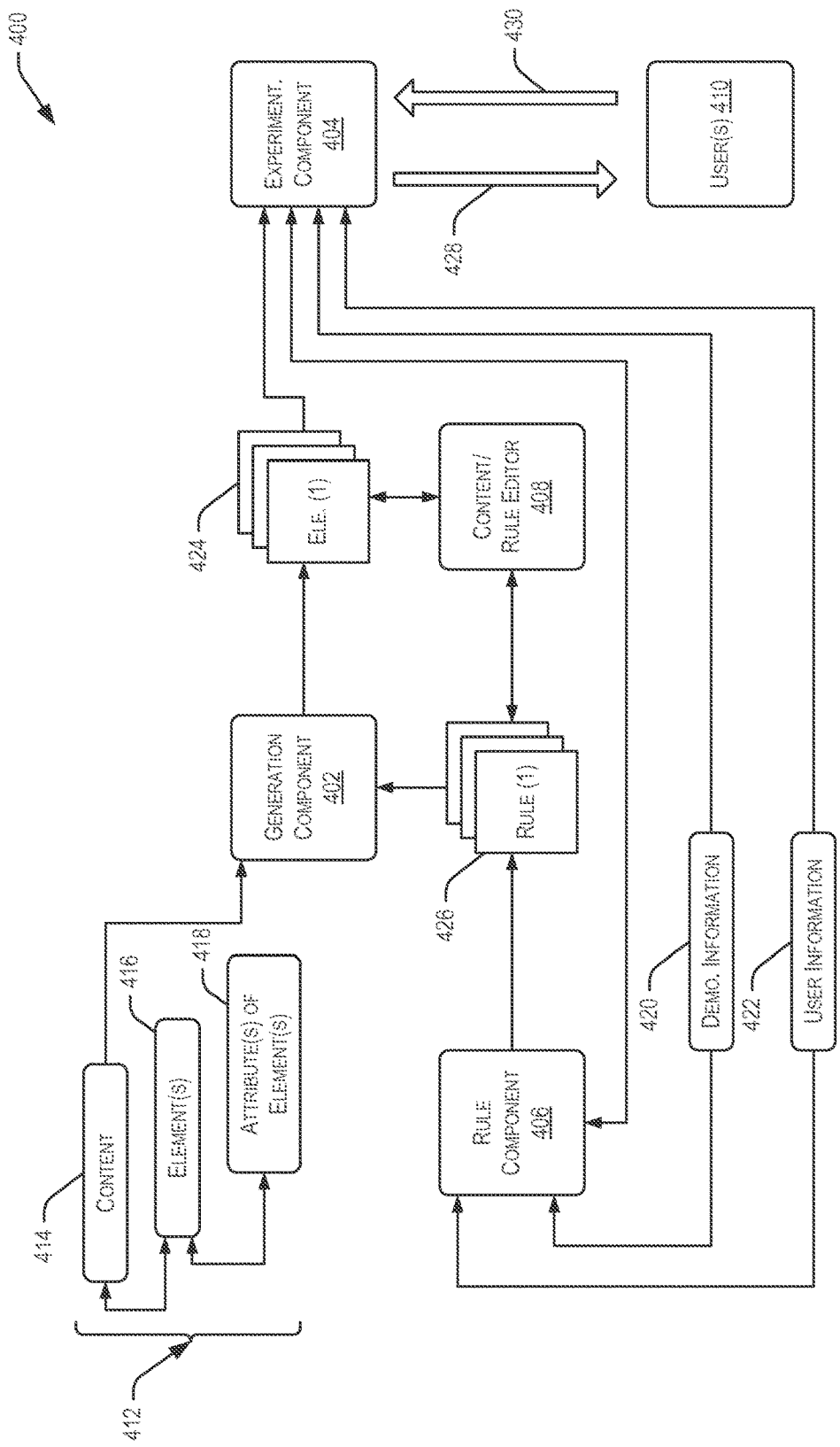
FIG. 4 is an example diagram depicting techniques relating to content generation and experimentation as described herein, according to at least one example.

Turning next to FIG. 4, in FIG. 4 is illustrated diagram 400 depicting techniques relating to content generation and experimentation as described herein. In some examples, the content variation service 202 (FIG. 2), including the content variation module 220 (FIG. 2), may perform the techniques described with reference to the diagram 400. The diagram 400 may include a plurality of boxes connected by arrows. The direction of travel of data may correspond to the direction of the arrows. For example, a double-sided arrow between a first box and a second box may indicate that data may flow from the first box to the second box and vice-versa. The diagram 400 may include a generation component 402, an experimentation component 404, a rule component 406, a content/rule editor 408, and user(s) 410. The generation component 402 may be an example of the generation component 306. The experimentation component 404 may be an example of the experimentation component 308. The rule component 406 may be an example of the rule component 310. The user(s) 410 may be an example of the user 208. In some examples, the generation component 402 may receive, identify, or otherwise access generation information 412. The generation information 412 may be used by the generation component 402 to generate variations of elements of content, such as web content. The generation information 412 may include content 414, elements 416, attributes of elements 418, and other suitable information (not shown). The content 414 may be an example of the content 102. In some examples, the generation component 402 utilizes more or less information than is illustrated as the generation information 412. The content 414 may include the elements 416. And, the elements 416 may include the attributes of the elements 418. The content 414 may include web content in the form of a website including one or more webpages. Within the content 414 (i.e., the one or more webpages of the website) may be arranged one or more elements, such as the elements 416. The elements 416 may make up the substance of the content 414. For example, the elements 416 may include an unordered list, an ordered list, a button, an image, a photograph, a string of text, a text box, a visual indicator, a table, a popup, a text entry box, a hyperlink, a table, a non-visual element, and any other suitable element that may be included as part of a website. The attributes of the elements 418 may include attributes, characteristics, and aspects of the elements 416 that correspond to the elements 416. In accordance with the techniques described herein, variations of the elements 416 may be generated, in some examples, by adjusting one or more attributes of the attributes of the elements 418. The attributes of the elements 418 may include any suitable aspect of an element. In some examples, aspects of an element may be controlled by markup language associated with the content 414. In some examples, the attributes of the elements 418 may include structural attributes (e.g., order, arrangement, and other structural attributes), visual attributes (e.g., colors, hues, outlining, aspect ratios, font style, font size, and other visual attributes), attributes related to non-visual elements (e.g., variables within in metadata that may be adjusted) and other attributes (e.g., identified names, numbers and units, brands-specific details, and other attributes).

In some examples, the content 414 may belong to a particular website, and the generation component 402 may review the content 414 of the website to determine the elements 416 that may be adjusted to generate variations 424. Reviewing the content 414 may include identifying a markup language (e.g., HTML, XML, CSS, etc.) associated with the content 414 and analyzing the markup language to determine the elements 416 and the attributes of the elements 418. In some examples, reviewing the content 414 may include analyzing the elements 416, including relationships between the elements 416, to determine the attributes of the elements 418.

The generation component 402 may also receive one or more rules 426. In some examples, the rules 426 may act as guardrails or limits to guide the generation of the variations 424 by the generation component 402. For example, the rules 426 may indicate that attributes of some elements should not be adjusted. As an example, for brand-specific logos, brand-specific colors, etc., the rules 426 may indicate that these attributes not be adjusted. In some examples, the rules 426 may be machine-defined or user-defined. In some examples, user-defined rules may be provided initially to guide early content generation, and machine-defined rules may be provided later to guide later content generation (e.g., after the experimentation component 404 provides the variations 424 to the users 410 and receives feedback). In some examples, the rules 426 (whether user-defined or machine-defined) may be reviewed by the content/rule editor 408 prior to being received by the generation component 402. In this manner, the content/rule editor 408 may ensure that the rules 426 are tailored to guide the generation component 402. In some examples, the content/rule editor 408 ensures that the rules 426 guide the generation component 402 to generate the rules 426 in accordance with one or more generation goals. The generation goals may be provided by a proprietor of the content 414. In some examples, the rules 426 may be element-based rules and may indicate how variations of certain elements should be generated with respect to other elements (e.g., color of element 1 and color of element 2 are always different). In some examples, the rules 426 may be attribute-based rules and may indicate how aspects of certain elements may altered to create variations (e.g., in an unordered list, do not adjust the last item in the list). In some examples, the rule component 406 may receive demographic information 420 and user information 422, and use at least a portion of the demographic information 420 and/or a portion of the user information 422 in creating the rules 426. For example, the rule component 406 may create rules related to groups of users based on characteristics identified from the demographic information 420. The rule component 406 may also create rules related to a particular user or group of users based on information identified from the user information 422.

In some examples, the demographic information 420 may include information based on age, sex, nationality, race, ethnicity, occupation, employment status, interests, geographic region, economic identifiers, social status identifiers, and other demographic information. The user information 422 may include user account information, preferences, regional and local identifiers, purchase history on a website (e.g., an electronic marketplace) or group of websites, search history on a website (e.g., an electronic marketplace) or group of websites, items placed in a digital repository (e.g., shopping cart) by the user at some point in time, items added to a future purchase list (e.g., a wish list), and other similar types of information pertaining to a user and the user's interactions with websites or groups of websites. As discussed in more detail below, at least a portion of the demographic information 420 and/or at least a portion of the user information 422 may be received by the experimentation component 404 and used in targeting the variations 424 to the users 410. In some examples, the users 410 may include a variety of users groups that may be defined based on the demographic information 420 and/or the user information 422.

By accessing at least some of the generation information 412 and, in some examples, a portion of the rules 426, the generation component 402 may generate the variations 424. The variations 424 may include permutations to various aspects of the elements 416. For example, a variation of the variations 424 may include a variation of a color, structure, or layout of an image (e.g., an element) of a webpage (e.g., content). Different variations will be discussed in more detail with reference to FIG. 5. In some examples, a portion of the variations 424 may be provided to the content/rule editor 408. The content/rule editor 408 may be configured to review variations. In some examples, the content/rule editor 408 may be a human editor. The content/rule editor 408 may be enabled to approve or reject portions of the variations 424 prior to the variations 424 being provided to the experimentation component 404. In this manner, the content/rule editor 408 may ensure that only approved and/or suitable variations are presented to the users 410 via the experimentation component 404. In some examples, the content/rule editor 408 may authorize certain variations or rules to be used. The content/rule editor 408 may be configured to review the variations 424 within the content 414. In this manner, the content/rule editor 408 may be configured to review and analyze the variations 424 in the context(s) that they may be presented to the users 410 (e.g., along with the elements 416 within the content 414). For example, certain ones of the variations 424 may be suitable in isolation, but may be unsuitable when compared with other elements that make up the content 414. Thus, the content/rule editor 408 may review the context of the variations 424 within the content 414.

The experimentation component 404 may be configured to receive the variations 424 and provide them for presentation to the users 410. This may involve the experimentation component 404 including the variations 424 in the content 414 as it provides the content 414 to the users 410 (i.e., delivery arrow 428) in response to requests from the users 410. For example, a user (of the users 410) may enter a web address (e.g., a uniform resource locator (URL)) for a webpage into a web browser on a user device (e.g., a laptop) and hit enter. This may send a request to a webserver associated with the web address. The webserver may include a component similar to the experimentation component 404 or be in communication with a similar component. In response to the request, the webserver, in association with the experimentation component 404, may provide the requested webpage with one or more of the variations 424 to the user device. The experimentation component 404 may then receive engagement information (i.e., feedback arrow 430) indicating aspects of the users' 410 interactions with the variations 424.

In some examples, the experimentation component 404 may receive the demographic information 420 and the user information 422, and use such information in determining which of the variations 424 to provide for presentation to which of the users 410. In some examples, one or more targeting goals may be determined from at least one of the demographic information 420 or the user information 422. The one or more targeting goals may indicate segments of the users 410 to which the experimentation component 404 may provide the variations 424.

In some examples, the experimentation component 404 may be included as part of a web analytics processing service. Whether as part of web analytics processing service or otherwise, the experimentation component 404 may perform multivariate testing, such as A/B testing, to test the effectiveness of certain variations on the users 410. In some examples, the multivariate test may include an engagement test that is provided to the users 410 as part of a "live" website. For example, the users 410 may be unaware that they are participating in the engagement test as they interact with the variations 424 of the content 414 (e.g., the live website). In some examples, the engagement test may be provided to the users 410 in a "closed" setting. For example, the users 410 may be aware that they are participating in an engagement test and the experimentation component 404 may control to whom the variations 424 are provided, such that only users in the closed setting receive the variations 424. Whether live or closed, the experimentation component 404 may collect engagement information (indicated by the feedback arrow 430) indicating aspects of the users' 410 interactions with the provided variations 424. In some examples, the engagement information may be processed to analyze one or more success metrics (e.g., purchases, adds-to-cart, adds-to-wish list, subscriptions, click-throughs, time on page, and other similar metrics) for a particular variation or multiple variations. In some examples, the success metrics are quantified and compared to baseline test results to determine the effectiveness of the variations. In some examples, the variations may be sorted by effectiveness according to the success metrics and scope (e.g., locale, language, region, customer/market segment, entry point to marketing page, and other scope-related metrics) to determine the most effective variations for each metric and scope. In this manner, the content 414 may be adjusted such that more effective variations are used in the future. In some examples, the variations may be ranked based on effectiveness. The ranking may be compared to a threshold, such that certain variations that fall below the threshold are not included provided to users for presentation. In this manner, the number of variations may be reduced.

The success metrics—and other engagement information—may be provided to the rule component 406, and used by the rule component 406 in creating new rules and adjusting existing rules 426. In some examples, the success metrics—and other engagement information—may be provided directly to the generation component 402 to be used by the generation component 402 in generating future variations. In either case, future variations generated by the generation component 402 may be generated based on the engagement information (whether directly or via a new rule created by the rule component 406). In this manner, the future variations may build off of the feedback received during presentation of the variations 424 by the experimentation component 404. By using the engagement information as feedback to the rule component 406, the rule component 406 may create rules for more efficient generation by the generation component 402. For example, if the experimentation component 404 determines that a certain variation or configuration of elements tested poorly with a group of users, the rule component 406 may create new rules to guide the generation component 402 to not try the same variation or configuration of elements again. Thus, the diagram 400 may include a closed feedback loop (i.e., the generation component 402 to the experimentation component 404 to the rule component 406 and back to the generation component). This feedback loop can be used to optimize variations for particular customers or groups of customers. For example, content generation and experimentation may be focused on users with certain characteristics. Using the feedback loop and multiple iterations of variations of content, an optimal variation may be identified. In some examples, the optimal variation may be optimal because it is the most effective variation for impacting certain success metrics. In some examples, machine-learning techniques may be implemented as part of the diagram 400. For example, machine-learning techniques may be used to create new rules based on engagement information or to create new variations based on engagement information. In this manner, the content variation service may become more effective and increase in confidence that certain variations are desirable to present to users. In some examples, any suitable machine learning technique implementing any suitable machine-learning algorithm may be selected. Example algorithms may include, supervised learning algorithms, statistical classification algorithms, unsupervised learning algorithms, reinforcement learning, deep learning, and other suitable algorithms.

Figure 5:
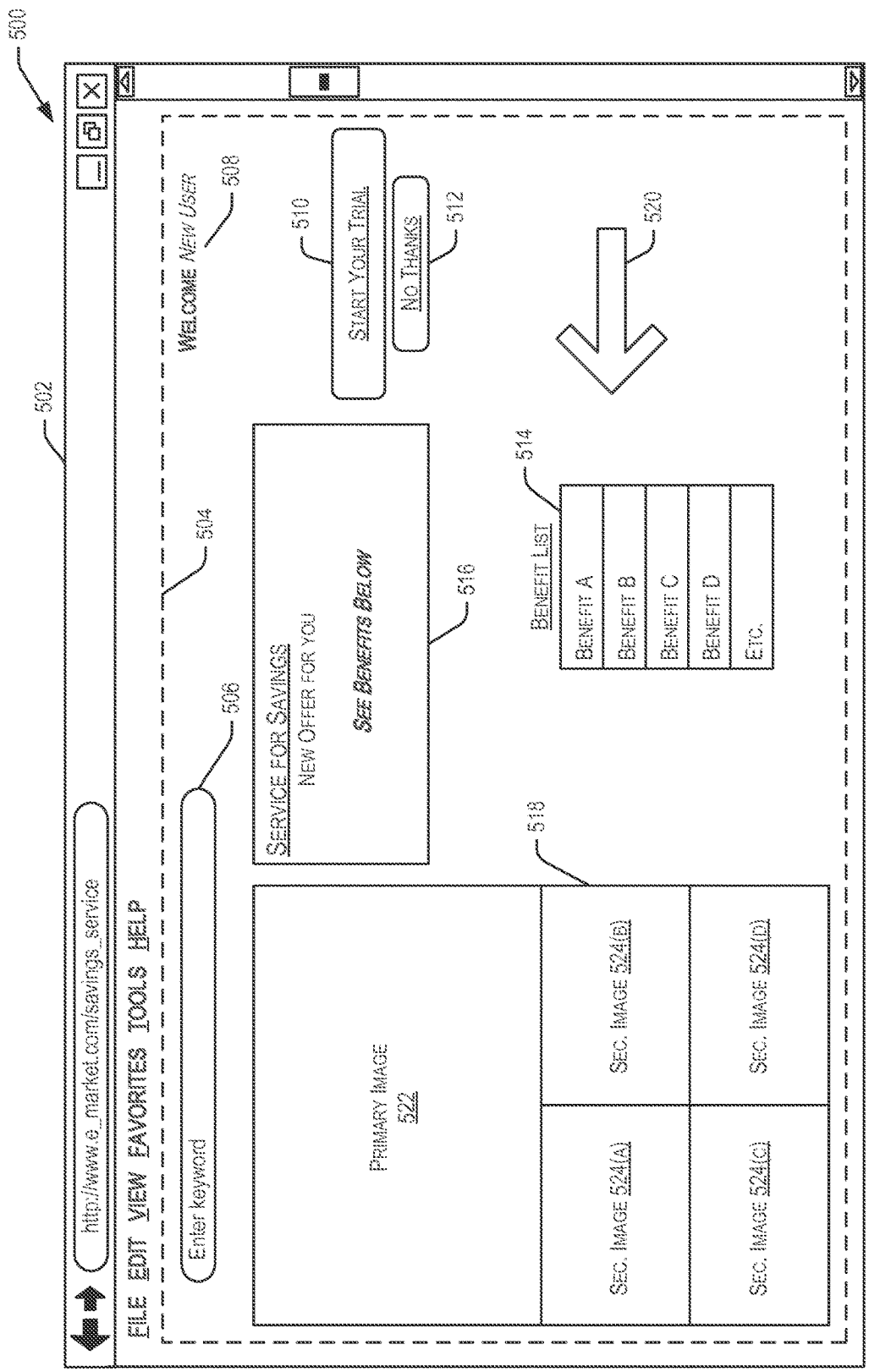
FIG. 5 is an example diagram depicting techniques relating to content generation and experimentation as described herein, according to at least one example.

Turning next to FIG. 5, in FIG. 5 is illustrated diagram 500 depicting techniques relating to content generation and experimentation as described herein. In some examples, the content variation service 202 (FIG. 2), including the content variation module 220 (FIG. 2), may perform the techniques described with reference to the diagram 500. The diagram 500 may include a user interface 502 in the form of a webpage. In some examples, the user interface 502 may be presented on a display of a user device based on instructions received from a content variation service. In some examples, the user interface 502 may include content 504 depicted within a dashed rectangle. The content 504 may be an example of the content 102. The content 504 may include a variety of elements—e.g., search box 506, text string 508, buttons (i.e., accept button 510 and decline button 512), list 514, text box 516, an image area 518, and a visual indicator 520. In some examples, the content 504 may include more or less elements than illustrated in FIG. 5. By implementing the techniques described herein, individual elements of the content 504 may be varied and presented to a customer population to test the effectiveness of the variations. In some examples, a variation of one element (e.g., an adjustment to the font size of the text string 508) is created and tested. In some examples, variations of more than one element (e.g., an adjustment to the font size of the text string 508 and an adjustment to the arrangement of the text in the text box 516) are created and tested.

In some examples, the list 514 may list benefits beginning with "Benefit A" and ending with "Etc.". The benefits A-Etc. may be benefits of subscribing to a particular service provided by a proprietor of the webpage. The list may be an unordered list and may be indicated as such by a <UL> tag within markup code associated with the content 504. Using techniques described herein, a content variation service may read the markup code, determine that the list 514 is an unordered list, and rearrange the order of the benefits A-Etc. in accordance with one or more rules, user information, and/or demographic information. This may result in a variation of the list 514. For example, because the last position includes "Etc.," a rule may indicate that this element not be moved from the last position. Benefits A-D, on the other hand, may not be controlled by the rule relating to "Etc." Thus, in some examples, the benefits A-D may be moved within the list 514 freely based on user information. For example, assume again that the list 514 includes benefits of subscribing to a service offered by a proprietor of the webpage. Also assume that benefit C is "free streaming of movies" and that the content variation service is aware (e.g., by accessing user information indicating that the user has placed movies into a shopping cart) that the user who is accessing the webpage values "movies." Based on this information, a variation of the list 514 for the user may be as follows: "Benefit C, Benefit A . . . Etc." In this manner, the variation of the list 514 may be tailored to a particular customer. In some examples, the benefits A-D may be moved freely based on demographic information. For example, assume again that the list 514 includes benefits of subscribing to a service offered by a proprietor of the webpage. Also assume that benefit D is "free delivery" and that the content variation service is aware (e.g., by accessing demographic information associated with the user) that the user who is accessing the webpage values "free delivery." Perhaps, this is because the user is located in a rural area. Based on this information, a variation of the list 514 for the user may be as follows: "Benefit D, Benefit A . . . Etc." In this manner, the variation of the list 514 may be tailored to a particular customer or group of customers. In some examples, custom tags may be created and included in markup code. For example, a custom tag <legal> may indicate legal text that should not be varied. Other custom tags indicating other attributes or elements that should or should not be varied may also be prepared.

In some examples, variations of the visual indicator 520 may be generated and presented to a user or groups of users. Variations of the visual indicator 520 may include, for example, adjustments to attributes of the visual indicator 520, such as color, size, location, border, shading, direction, and other similar attributes. In some examples, variations of the text string 508 may be generated and presented to a user or groups of users. Variations of the text string 508 may include, for example, adjustments to attributes of the text string 508, such as font size, font color, formatting of font, substance of text string (i.e., changing "New user" to "Prospective user"), and other similar attributes. In some examples, variations of the text box 516 may be generated and presented to a user or groups of users. Variations of the text box 516 may include, for example, adjustment to attributes of the text box 516, such as text box size, font size, font alignment, outline of text box, and other similar attributes.

The image area 518 may include a primary image 522 and secondary images 524(a)-524(d). In some examples, an image that may be included in the image area 518 may include a variety of image formats, such as vector format, raster format, photographs, line art, and other image formats. In some examples, the primary image 522 and/or one of the secondary images 524(a)-524(d) may be adjusted to create variations. In some examples, creating a variation of an image may include switching out the image with a different image. For example, suppose that the primary image 522 displays a photograph of a female user enjoying a movie. A variation of the primary image 522 may include switching the photograph of the female with a photograph of a male user enjoying a movie. In this manner, the primary image 522 itself may be switched out. In some examples, creating a variation may include adjusting attributes of the image. For example, suppose again that the primary image 522 displays a photograph of a female user enjoying a movie. A variation of the primary image 522 may include applying an effect to one or more layers of the image (e.g., gradient, saturation, brightness, transparency, noise, color adjustments, histogram, and other similar effects). In some examples, variations of the secondary images 524(*a*)-524(*d*) may be generated and presented dependently or independently of the primary image 522.

In some examples, the content 504 may include elements that include interchangeable portions. For example, the accept button 510 may be an element and the text of the accept button 510 (i.e., "Start Your Trial") may be an interchangeable portion. Using the techniques described herein, a content variation service may analyze the elements of the content 504 to determine the context of the interchangeable portion of the accept button 510. In some examples, the content variation service may also analyze elements of other content in order to determine the context of those elements. A likeness score may then be determined that compares the context score of the content 504 with the context scores of other content. As illustrated in FIG. 5, the accept button 510 is currently presented in the context of a purchase funnel for a service. This may be determined because the other elements of the content 504 are directed towards purchasing the service. In this manner, the content 504 may be presented in order to encourage a user to sign up for a trial version of the service. Because the context in which the interchangeable portion of the accept button 510 is presented is known, results from engagement tests for different text of the interchangeable portion may be relevant for similar contexts within different webpages. For example, suppose that a variation of the accept button 510 includes the text "Click Here to Begin Saving," a similar variation may be presented in a webpage advertising a different service that also includes a trial and savings (i.e., a similar context). In this manner, the interchangeable portions are interchanged and computing resources conserved. The context of certain elements may be also included in one or more rules.

Figure 6:
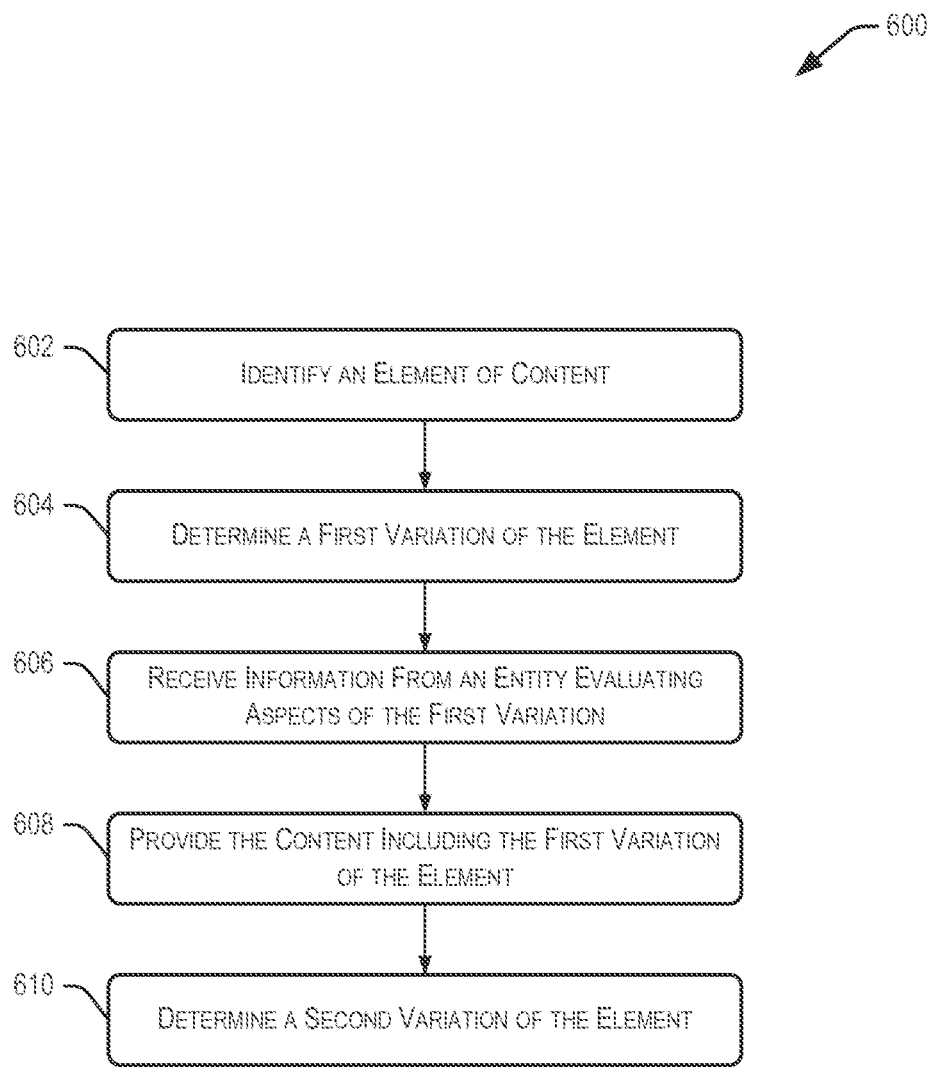
FIG. 6 is a flow diagram depicting example acts for implementing techniques relating to content generation and experimentation as described herein, according to at least one example.

Turning next to example acts and/or procedures that may be performed using techniques described herein, in accordance with at least one example. FIG. 6 depicts process 600 including example acts for techniques relating to content generation and experimentation in accordance with at least one example. Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The content variation module 220 (FIG. 2) of the content variation service 202 (FIG. 2) may perform the process 600 of FIG. 6. The process 600 may begin at 602 by identifying an element of content. In some examples, identifying the element of the content may be performed by the generation component 306 (FIG. 3). Identifying the element of the content may include reading markup code associated with the content and/or analyzing visual aspects of elements associated with the content. At 604, the process 600 determines a first variation of the element. In some examples, determining the first variation of the element may be performed by the generation component 306. Determining the first variation of the element may include adjusting one or more attributes, aspects, or characteristics of the element such that a new element is generated that is different, in at least one way, from the identified element. In some examples, determining the first variation may include determining based at least in part on demographic information, user information, and/or a rule. At 606, the process 600 receives information from an entity evaluating aspects of the first variation. In some examples, receiving the information from the entity may be performed by the generation component 306. Receiving the information from the entity may include receiving evaluation information from a content/rule editor. In some examples, the information—whether designated as evaluation information or otherwise—from the content/rule editor may include review of variations. In some examples, the information from the content/rule editor may include rules based on engagement information, demographic information, user information, and any suitable combination of the foregoing. At 608, the process 600 provides the content including the first variation of the element. In some examples, providing the content may be performed by the experimentation component 308 (FIG. 3). Providing the content including the first variation may include providing the content including the first variation of the element for presentation to a user as part of an engagement test. In some examples, the engagement test may test at least one effect of the variation of the element on the user. At 610, the process 600 determines a second variation of the element. In some examples, determining the second variation may be performed by the generation component 306. Determining the second variation may include determining based at least in part on a portion of the engagement information.

Figure 7:
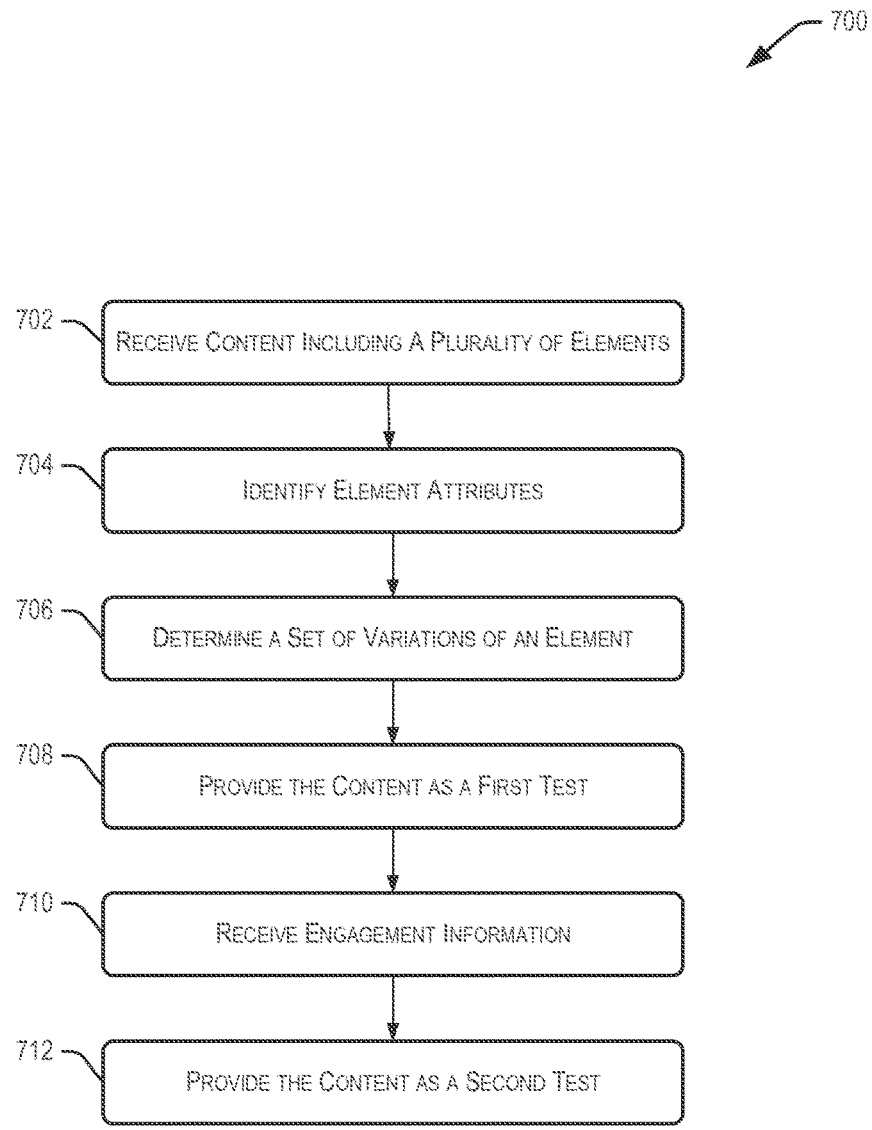
FIG. 7 is a flow diagram depicting example acts for implementing techniques relating to content generation and experimentation as described herein, according to at least one example.

FIG. 7 depicts process 700 including example acts for techniques relating to content generation and experimentation in accordance with at least one example. The content variation module 220 (FIG. 2) of the content variation service 202 (FIG. 2) may perform the process 700 of FIG. 7. The process 700 may begin at 702 by receiving content including a plurality of elements. In some examples, receiving the content including the plurality of elements may be performed by the communication component 304 (FIG. 3). Receiving the content including the plurality of elements may include receiving content associated with a website. In some examples, the website may be associated with an electronic marketplace and the elements may describe aspects of the electronic marketplace. At 704, the process 700 identifies element attributes. In some examples, identifying element attributes may be performed by the generation component 306 (FIG. 3). Identifying element attributes may include identifying element attributes that correspond to individual elements of the plurality of elements. At 706, the process 700 determines a set of variations of an element. In some examples, determining the set of variations of the element may be performed by the generation component 306. Determining the set of variations of the element may including determining based at least in part on a portion of the element attributes corresponding to the element and in accordance with a rule. In some examples, the rule may define one or more constraints for generation of variations.

In some examples, the set of variations may include a variation of a structure of the element, a variation of a color of the element, a variation of a design of the element, or a variation of a layout of an element. At 708, the process 700 provides the content as a first test. In some examples, providing the content as the first test may be performed by the experimentation component 308 (FIG. 3). Providing the content may include providing the content for presentation to a group of users of the website. In some examples, the test may include a first variation of the element from the set of variations of the element. At 710, the process 700 receives engagement information. In some examples, receiving the engagement information may be performed by the experimentation component 308. Receiving the engagement information may include receiving engagement information corresponding to the first test. In some examples, the engagement information may indicate how users of the group of users responded to the first variation of the element. At 712, the process 700 provides the content as a second test. In some examples, providing the content as the second test may be performed by the experimentation component 308. Providing the content may include providing the content for presentation as a second test to the group of users of the website. In some examples, the second test may include at least a second variation of the set of variations of the element.

Figure 8:
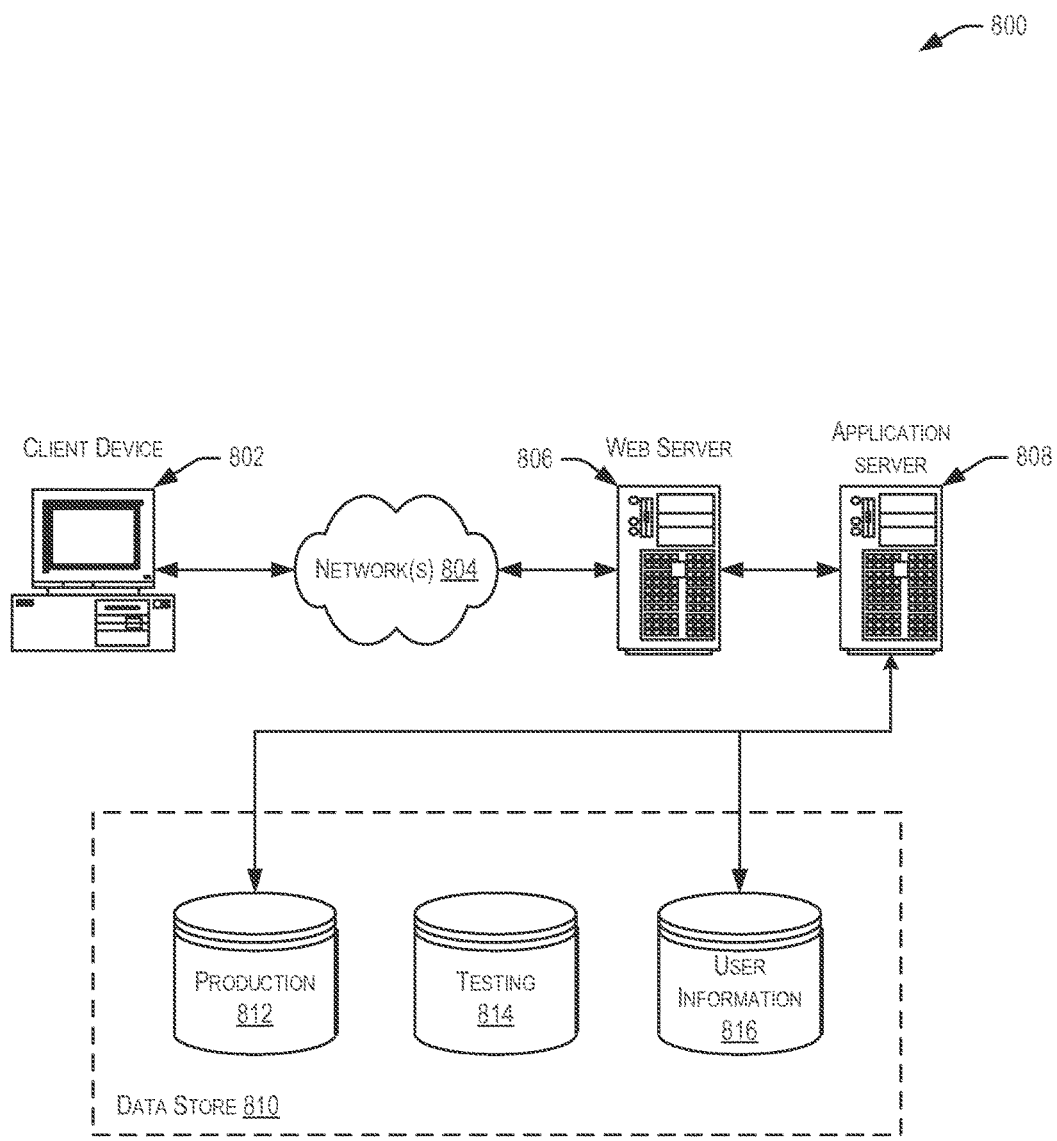
FIG. 8 is an example schematic environment for implementing techniques relating to content generation and experimentation as described herein, according to at least one example.

FIG. 8 illustrates aspects of an example schematic environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any suitable device operable to send and receive requests, messages, or information over a suitable network 804 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for accessing requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"). Open System Interconnection ("OSI"), File Transfer Protocol ("FTP"). Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as JAVA®, C, C# or C++, or any scripting language, such as Perl, Python or TCL, as well as combinations thereof. The server(s) may also include database servers, including without limitation, those commercially available from ORACLE®, MICROSOFT®, SYBASE® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage devices for storing computer-executable instructions that, when executed by one or more computer systems, configure the one or more computer systems to perform operations comprising:
   receiving content including a plurality of elements, the content associated with a web site;
   identifying element attributes corresponding to individual elements of the plurality of elements;
   selecting an element of the plurality of elements for use in an engagement test based at least in part on profile information of a group of users;
   generating a set of variations of the element based at least in part on a portion of the element attributes corresponding to the element and in accordance with a machine-generated rule that comprises one or more constraints to guide the generation of the set of variations, the set of variations comprising at least one of a variation of a structure of the element, a variation of a color of the element, a variation of a design of the element, a variation of a layout of the element, a variation of non-visual aspect of the element, or a variation of a function of the element, the machine-generated rule being previously generated based at least in part on earlier engagement information received as part of an earlier test;
   providing the content as a first engagement test for presentation to the group of users of the website, the first engagement test including at least a first variation of the set of variations of the element;
   receiving engagement information corresponding to the first engagement test, the engagement information usable to measure, based at least in part on one or more success metrics, how users of the group of users interacted with the first variation of the element; and
   providing the content as a second engagement test for presentation to the group of users of the website, the second test including at least a second variation of the set of variations of the element.

2. The one or more non-transitory computer-readable storage devices of claim 1, wherein the element comprises at least one of an unordered list, an ordered list, a button, an image, a photograph, a string of text, a visual indicator, a table, or a non-visual element.

3. The one or more non-transitory computer-readable storage devices of claim 1, wherein the first test comprises a controlled experiment with at least two variants, and wherein the first variation comprises a second variant of the at least two variants.

4. The one or more non-transitory computer-readable storage devices of claim 1, wherein the operations further comprise, prior to providing the content as the second engagement test, selecting the second variation from the set of variations based at least in part on the one or more success metrics.

5. The one or more non-transitory computer-readable storage devices of claim 1, wherein:
   the engagement information is first engagement information and the machine-generated rule is a first machine-generated rule; and
   the operations further comprise:
      receiving second engagement information corresponding to the second engagement test; and
      using a machine learning operation to generate a second machine-generated rule based at least in part on the first engagement information and the second engagement information, the second machine-generated rule usable to generate an additional set of variations of the element.

6. A computer-implemented method comprising:
   identifying, by a computer system, an element of content for use in an engagement test based at least in part on profile information of at least one user, the element including a plurality of element attributes;
   generating, by the computer system, a set of variations of the element in accordance with a machine-generated rule previously generated based at least in part on earlier engagement information received as part of an earlier engagement test;
   selecting a first variation from the set of variations based at least in part on an element attribute of the first variation, the first variation comprising an adjustment to at least one attribute of the plurality of attributes;
   receiving information from an entity evaluating one or more aspects of the first variation of the element;
   providing, based at least in part on a portion of the information, the content including the first variation of the element for presentation to a user as part of a first engagement test, the first engagement test testing at least one effect of the first variation of the element with respect to the user; and generating, by the computer system, a second variation of the element based at least in part on the first engagement test.

7. The computer-implemented method of claim 6, wherein identifying the element of the content includes at least one of reading a markup language, analyzing a portion of attributes from the plurality of attributes, or analyzing attributes of other elements of the content.

8. The computer-implemented method of claim 6, wherein the element comprises at least one of an unordered list, an ordered list, a button, an image, a photograph, a string of text, a text box, a visual indicator, a table, or a non-visual element.

9. The computer-implemented method of claim 6, wherein the set of variations comprise at least one of a variation of a structure of the element, a variation of a color of the element, a variation of a design of the element, a variation of a layout of the element, a variation of non-visual aspect of the element, or a variation of a function of the element.

10. The computer-implemented method of claim 6, wherein the first engagement test comprises at least two variants corresponding to a control test and an adjusted test, the first variation comprising a control variant of the at least two variants to be provided for presentation in connection with the control test.

11. The computer-implemented method of claim 10, wherein the second variation comprises an adjusted variant of the at least two variants to be provided for presentation in connection with the adjusted test.

12. The computer-implemented method of claim 11, wherein providing the content including the first variation of the element for presentation to the user as part of the first engagement test includes providing the content including the control variant for presentation to the user as part of the control test, and wherein the method further comprises:
providing the content including the adjusted variant for presentation to the user as part of the adjusted test;
comparing first engagement information corresponding to the control test with second engagement information corresponding to the adjusted test; and
based at least in part on the comparing, determining an optimal variation.

13. The computer-implemented method of claim 6, wherein the first variation of the element comprises a first set of variations of the element, wherein providing the content including the first variation includes providing the content including different variations of the first set of variations of the element for presentation to a plurality of users as part of a plurality of engagement tests, and wherein the plurality of engagement tests testing a plurality of effects of the different variations of the element with respect to the plurality of users.

14. The computer-implemented method of claim 13, wherein the second variation of the element comprises a second set of variations of the element, and wherein determining the second variation of the element includes determining the second set of variations of the element in accordance with a machine learning technique based at least in part on results from the plurality of engagement tests.

15. The computer-implemented method of claim 6, further comprising:

receiving engagement information collected during the first engagement test;
providing at least a portion of the engagement information to a content editor; and
receiving, from the content editor, a user-defined generation rule, the determination of the second variation of the element based at least in part on the user-defined generation rule.

16. The computer-implemented method of claim 6, wherein:
generating the second variation of the element comprises generating an optimal variation of the element based at least in part on a value of a success metric exceeding a threshold, the success metric determined based at least in part on the first engagement test and at least one other engagement test; and
the optimal variation is optimal with respect to a set of users to which the user belongs.

17. A system comprising:
memory that stores computer-executable instructions; and
at least one processor configured to access the memory and execute the computer-executable instructions to collectively at least:
identify a first element of a first webpage for use in an engagement test based at least in part on profile information of at least one user, the first webpage including a plurality of elements, the first element including an interchangeable portion;
generate a first variation of the interchangeable portion of the first element based at least in part on other elements of the plurality of elements of the first webpage and in accordance with a machine-generated rule previously generated based at least in part on earlier engagement information received as part of an earlier engagement test;
perform a first engagement test by providing the first webpage for presentation, the first webpage including the first variation of the interchangeable portion;
determine a likeness of the first webpage with a second webpage based at least in part on first features of the first webpage and second features of the second webpage, the second webpage including the interchangeable portion; and
provide the second webpage for presentation, the second webpage including a second element including the first variation of the interchangeable portion, the second webpage provided for presentation based at least in part on feedback from the engagement test and the likeness.

18. The system of claim 17, wherein the first element comprises a first button, the interchangeable portion comprises a text portion of the first button, and the first variation comprises a string of text.

19. The system of claim 17, wherein determining the likeness comprises:
determining, based at least in part on the first features of the first webpage, a first context score when the interchangeable portion is included in the first webpage;
determining, based at least in part on the second features of the second webpage, a second context score when the interchangeable portion is included in the second webpage;
comparing the first context score and the second context score; and
providing the first variation of the interchangeable portion when the first context and the second context score are within a same range.

20. The system of claim 17, wherein generating the first variation of the interchangeable portion includes generating a set of variations programmatically and in accordance with the machine-generated rule, and selecting the first variation from the set of variations.

\* \* \* \* \*